United States Patent [19]
Tyler et al.

[11] 3,755,127
[45] Aug. 28, 1973

[54] APPARATUS FOR ELECTROCHEMICAL MACHINING

[75] Inventors: Roger K. Tyler, Redford; Jack New, Garden City, both of Mich.

[73] Assignee: TRW Inc., Cleveland, Ohio

[22] Filed: Apr. 13, 1972

[21] Appl. No.: 243,772

[52] U.S. Cl. .......................... 204/224 M, 204/129.7
[51] Int. Cl. ........................... B23p 1/00, B23p 1/04
[58] Field of Search ...................... 204/224 M, 129.7

[56] References Cited
UNITED STATES PATENTS
| | | | |
|---|---|---|---|
| 3,399,125 | 8/1968 | Mikoshiba et al. | 204/129.7 |
| 3,637,481 | 1/1972 | Williams | 204/224 M |
| 3,658,682 | 4/1972 | Fulkerson et al. | 204/224 M |
| 3,673,072 | 6/1972 | Fleury et al. | 204/224 M |

Primary Examiner—John H. Mack
Assistant Examiner—D. R. Valentine
Attorney—Benjamin H. Sherman, J. Arthur Gross and James Van Santen et al.

[57] ABSTRACT

Apparatus for electrochemical machining of metals utilizing a highly conductive electrolyte wherein a self-contained electrolyte circulating system is provided for each machine or pair of machines, and electrical isolation is maintained between this self-contained electrolyte circulating system and the main supply system during the machining operation to prevent electrical interaction between a substantial number of machines which are supplied from the same source of electrolyte.

5 Claims, 1 Drawing Figure

PATENTED AUG 28 1973   3,755,127
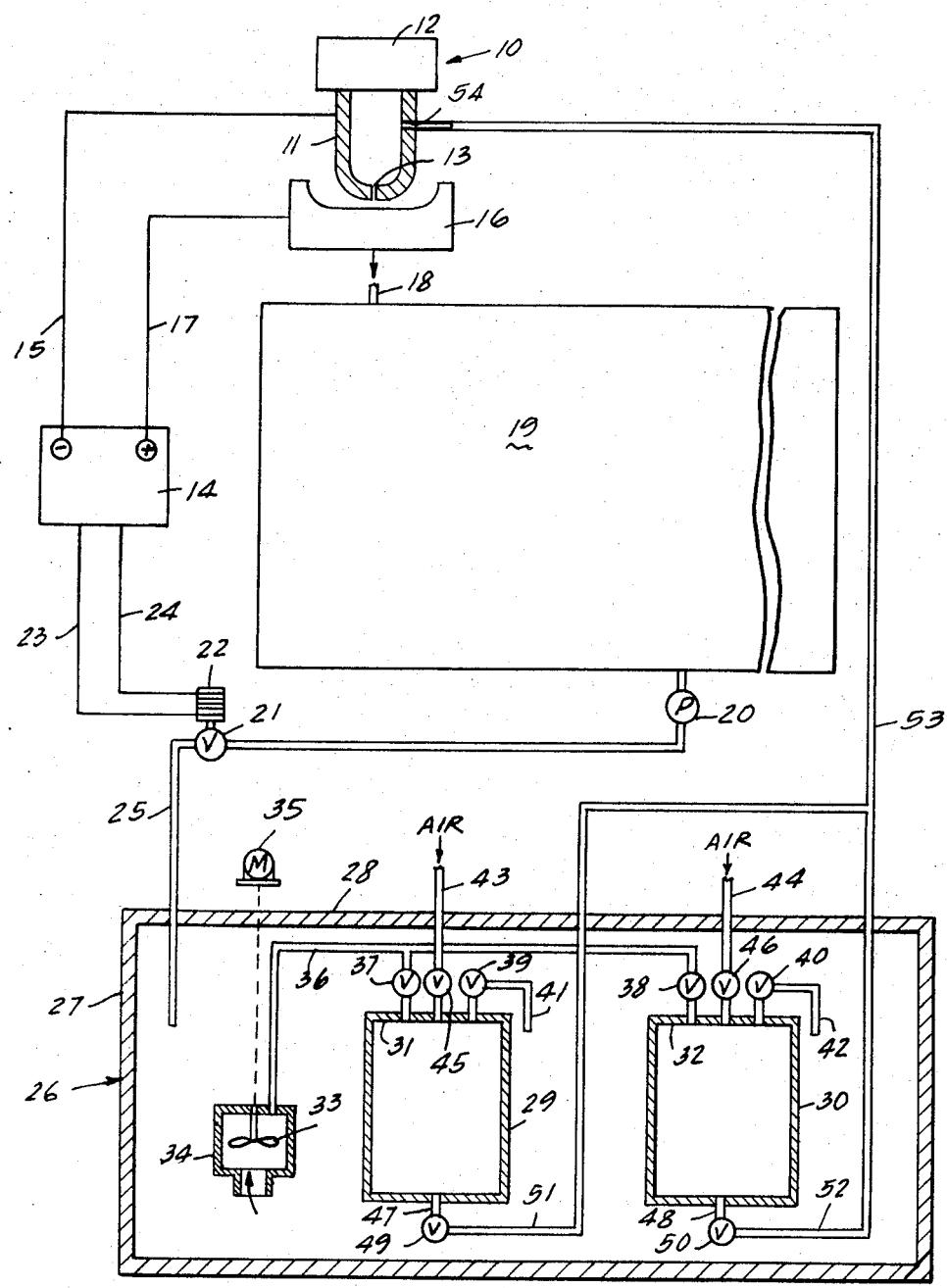

APPARATUS FOR ELECTROCHEMICAL MACHINING

BACKGROUND OF THE INVENTION

1. Field of the Invention

This invention is in the field of electrochemical machining apparatus and is particularly directed to installations employing a large number of such machines wherein the electrolyte supply for one or a small number of such machines is individualized and electrically separated from the main storage tank during the electrochemical machining operation.

2. Description of the Prior Art

Electrochemical machining, usually referred to as "ECM" is the controlled removal of metal by anodic dissolution in an electrolytic cell in which the workpiece is the anode and the tool is the cathode. The electrolyte is pumped through a gap between the tool and the workpiece while direct current is passed through the cell at a low voltage to dissolve metal from the workpiece at approximately 100 percent efficiency.

Electrochemical machining can be used to do work that would be difficult or impossible by mechanical machining. This work includes machining hard metals such as hardened steel and heat resisting alloys, and odd-shaped, small, deep holes. Electrochemical machining is also used for operations such as face milling, deburring, etching and marking.

While many different types of aqueous solutions of inorganic compounds have been used as electrolytes, among the most common are concentrated solutions of sulfuric acid, hydrochloric acid or solutions of aqua regia. These strong acid solutions retain the anodically removed metal in solution and do not produce sludge under the conditions of machining.

The success of the electrochemical machining operation is to a large extent dependent upon the proper control of the variables present. The most important variables are the tool feed rate, the current density, the electrolyte composition, suspended solids content, temperature and flow rate, the construction and finish of the tool and fixture material, the workpiece material and its condition, and the cutting gap. For accurate machining, a steady state condition should be established in which the dissolution of the workpiece material is balanced by the feed of the tool. This requires a uniform, controllable tool feed rate.

Current density is the chief factor in determining the permissible rate of tool feed, as the metal removal process is governed by Faraday's Law. Other factors remaining constant, the rate of penetration varies directly with the current. Current density also affects the surface finish of the work.

The electrolyte in the electrochemical machining process has three functions, that of carrying the current between the tool and the workpiece, the removal of products of reaction from the cutting region, and the removal of heat produced in the operation. Electrolytes must have high electrical conductivity, low toxicity, chemical and electrochemical stability, and an absence of passivating effects.

Conductivity of the electrolyte is important because it affects power requirements and rate of penetration. An over-concentrated solution may become saturated and allow the formation of crystals that can damage pumps, valves, instruments, and pipes. A very weak solution causes local or intermittent passivity of the work which makes machining difficult.

The rate of flow of the electrolyte is important because the electrolyte must remove the heat and the products of the chemical reaction. Generally, the larger the ratio of flow to current, the better the removal of heat and reaction products. However, the cost of pumping increases as the flow increases, and excessive flow rate can cause cavitation effects and nonuniform metal removal.

The control of these interrelated variables is quite difficult on a production line basis. It becomes more difficult when a single storage tank is used to supply electrolyte to a large number of machining stations since the electrolyte is such a good conductor that electrical interference can exist between the various machining assemblies on a production line through the medium of the storage tank used to supply the electrolyte. Since current density and voltage are critical items in a proper electrochemical machining operation, this interaction between different machining stations makes it very difficult to secure the proper electrical conditions at any given station.

SUMMARY OF THE INVENTION

The present invention provides an electrochemical machining apparatus assembly including at least one electrochemical machining station including a nozzle and a workpiece to be machined. A direct current power supply has its positive side connected to the workpiece and its negative side to the nozzle. Inlet means are provided at the nozzle for introducing a highly conductive electrolyte therein. A relatively large capacity storage tank receives the electrolyte after the electrolyte has participated in the electrochemical machining operation, the storage tank having filtering means or other means for removing any contaminants present. The used electrolyte from all of the machining stations is supplied to the relatively large capacity storage tank, but each milling station which may include one or two machines has its self-contained electrolyte circulating system. The system includes a relatively small capacity tank arranged to be fed from the large capacity storage tank when no machining is taking place. At least one container is immersed in the relatively small tank, and fluid pressure means such as compressed air is employed for emptying the electrolyte contained in the container and delivering it to a particular machining station. Interaction between the machining station and the large capacity storage tank is prevented by providing a valve means controlled by the power supply of the system to interrupt the fluid communication between the relatively large capacity tank and the relatively small capacity tank when the power supply is energized.

BRIEF DESCRIPTION OF THE DRAWING

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which:

The single FIGURE of the drawing is a somewhat schematic illustration of an electrochemical machining system, with portions thereof in cross-section. Double

DESCRIPTION OF THE PREFERRED EMBODIMENTS

In the FIGURE, reference numeral 10 indicates generally an electrochemical machining station employing a machining tool 11 under the control of a constant tool feed device generally indicated at reference numeral 12 of the drawings. The tool 11 includes a nozzle 13 whose dimensions are exaggerated for the purposes of illustration. The tool 11 is connected to the negative side of a D.C. power supply 14 by means of a lead 15. A workpiece 16 constitutes the anode of the electrochemical machining system and is connected to the positive side of the power supply 14 by means of an electrical lead 17.

Used electrolyte collected from the machining station, and others like it, is introduced via a conduit 18 into a large capacity storage and filter unit generally designated at reference numeral 19 of the drawings. The capacity of the unit 19 is sufficiently large to hold enough electrolyte to supply all of the individual machining stations.

The clarified electrolyte is pumped from the storage unit 19 to the individual machining stations by means of a series of pumps, one of which is illustrated at reference numeral 20 of the drawing. The output of the pump 20 is under the control of a valve 21 which is operated by a solenoid 22 connected to a low voltage, low current portion of the power supply 14 by means of leads 23 and 24.

The electrolyte from the storage unit 19 is pumped through a conduit 25 into an electrolyte circulating unit generally indicated at reference numeral 26 of the drawing. The electrolyte circulating unit 26 may include a relatively small capacity tank 27 having a cover 28 thereon. The tank 27, the cover 28 and the various valves and fluid conduits are all composed of an inert or chemically resistant dielectric material which may be a synthetic resin, glass, or a ceramic material.

Immersed within the electrolyte contained in the tank 27 is a pair of containers 29 and 30 also composed of an inert, electrical insulating material. The containers 29 and 30 are provided with covers 31 and 32, respectively.

Electrolyte within the tank 27 is circulated by means of an impeller 33 located within a housing 34 and driven by means of a motor 35. A conduit 36 delivers the electrolyte sequentially to the containers 29 and 30, depending on which is on stream at the time. Air operated valves 37 and 38 are provided for controlling introduction of the electrolyte into one or the other of the containers. Each of the containers is also provided with an overflow control valve 39 and 40, respectively, to direct overflow from the containers into their associated conduits 41 and 42, respectively.

Propulsion of the electrolyte is achieved through a pair of air pressure lines 43 and 44 under the control of air operated valves 45 and 46. Pressurizing of the interior of the containers 29 and 30 serves to force the electrolyte contained therein through a discharge conduit 47 or 48, under the control of air operated valves 49 and 50, respectively. The valves 49 and 50, when open, direct the electrolyte through conduits 51 and 52, respectively, into a tool supply line 53 from which it is directed into the interior of the tool 11 through an inlet 54.

The operating conditions depend, of course, on the material being machined. Electrolyte temperatures are preferably maintained in the range from about 80° to 100° F. Pumping pressure on the electrolyte varies with the inside diameter of the nozzle and generally ranges from about 10 to 70 pounds per square inch with a range of 40 to 60 pounds per square inch being preferred. Nozzle lengths may also vary appreciably, with lengths from 0.090 to 0.110 inch being useful for very small diameter drilling. The inside diameter of the nozzle may vary considerably, with a range of 0.0003 to 0.001 inch being useful for very small hole drilling. The gap distance between the discharge end of the nozzle and the workpiece may vary from about 0.030 to 0.150 inch in length with an initial gap of 0.70 inch being preferred for efficient drainage of electrolyte.

The direct current potential between the anode and the cathode may range from about 100 to 800 volts. This potential may be varied as the machining operation progresses, with an initial potential below 100 volts being employed until dimples are formed in the surface of the workpiece sufficient to direct jet streams away from the surface of the workpiece. This voltage may then be increased incrementally as the cavities increase in depth. Starting currents as low as 0.10 to 0.30 ampere may be used until the cavity is sufficiently shaped to direct the jets away from the workpiece, whereupon the voltage may be increased to maintain a current of about 0.75 to 1.5 amperes. The container 27 is filled with electrolyte from the storage unit 19 at the end of the day's operation, when the machining stations are shut down. Then, when the machining operations are to begin, the power supply 14 is energized, causing the solenoid 22 to close the valve 21 and electrically isolate the large volume of highly conductive electrolyte in the storage unit 19 from the individual machining units.

The various air operated valves on the containers 29 and 30 are programmed by means of a fluidic (air logic) sequential timing control or the like so that continuous introduction of electrolyte is effected into the tool 11, with one container being filled as the other one is discharging its contents. For example, assuming that container 29 is being filled and container 30 is delivering the electrolyte to the tool, valve 37 will be opened and valve 38 will be closed. Outlet valve 49 will be closed and outlet valve 50 on container 30 will be open. Valve 45 which controls the supply of compressed air will be closed, and valve 46 will be open to provide the fluid pressure for discharging the electrolyte through the discharge valve 50. The overflow valve 39 in container 29 will be open, and valve 40 will be closed. In the next succeeding cycle, when container 30 is being filled and container 29 is being emptied, the valves which had previously been open will now be closed, and those which had been closed will now be open.

From the foregoing, it will be understood that the system of the present invention provides for individual control of electrolyte circulation for one or a few machining stations, while isolating each of the machining stations from the main supply tank. In this way, close control of the electrical variables at each station is rendered considerably easier to maintain and electrical interaction between the stations is avoided.

It will also be evident that various modifications can be made to the described embodiments without departing from the scope of the present invention.

We claim as our invention:

1. An apparatus for electrochemical machining comprising at least one electrochemical machining station including a nozzle and a workpiece to be machined, a direct current power supply, means connecting the positive side of said supply to said workpiece and the negative side of said supply to said nozzle, inlet means at said nozzle for introducing a highly conductive electrolyte therein, a relatively large capacity storage tank receiving the electrolyte from said station after participating in the electrochemical machining operation, a relatively small capacity tank in fluid communication with said relatively large capacity tank, at least one container immersed in said relatively small capacity tank, fluid pressure means for emptying the electrolyte contained in said container, conduit means connecting said container to said inlet means at said nozzle, and valve means controlled by said power supply to interrupt the fluid communication between said relatively large capacity tank and said relatively small capacity tank when said power supply is energized.

2. The apparatus of claim 1 in which said relatively small capacity tank includes a pair of said containers, and said fluid pressure means operates on each of said containers sequentially to provide a continuous stream of electrolyte into the inlets of said nozzles.

3. The apparatus of claim 1 which includes an agitating and pumping means in said relatively small capacity tank.

4. The apparatus of claim 1 in which said valve means is an air operated valve.

5. The apparatus of claim 1 in which said fluid pressure means includes means for introducing compressed air into said container for discharging electrolyte from the base of said container.

* * * * *